United States Patent
Lehmann

[15] 3,675,095
[45] July 4, 1972

[54] CAPACITORS OF CONSTANT CAPACITANCE

[72] Inventor: William Lester Lehmann, Indianapolis, Ind.

[73] Assignee: RCA Corporation

[22] Filed: June 10, 1971

[21] Appl. No.: 151,717

[52] U.S. Cl. .............................................. 317/261, 317/242
[51] Int. Cl. ....................................................... H01g 1/035
[58] Field of Search ......................................... 317/242, 261

[56] References Cited
FOREIGN PATENTS OR APPLICATIONS

811,295  4/1959  Great Britain ........................ 317/261

Primary Examiner—E. A. Goldberg
Attorney—Glenn H. Bruestle

[57] ABSTRACT

An improved printed capacitor includes a pair of inner and outer, closely spaced, coplanar electrodes. The inner electrode has the general shape of a cross, and the outer electrode surrounds the inner electrode and also has the general shape of a cross. The capacitor has a substantially constant capacitance regardless of the relative position of the inner electrode with respect to the outer electrode.

6 Claims, 6 Drawing Figures

PATENTED JUL 4 1972  3,675,095

INVENTOR.
William L. Lehmann
BY Arthur J. Spechler
ATTORNEY

CAPACITORS OF CONSTANT CAPACITANCE

BACKGROUND OF THE INVENTION

This invention relates generally to capacitors of constant capacitance, and, more particularly, to improved printed capacitors whose capacitance is substantially constant, regardless of the relative position of one electrode with respect to another coplanar electrode. The improved capacitors are particularly useful in the manufacture of thick-film, hybrid, integrated circuits of the type used in the electronic arts.

In the manufacture of thick-film, hybrid, electronic circuits, it has been proposed to form capacitors by printing two spaced-apart, coplanar electrodes adjacent to each other, as by stencil or screening methods well-known in the art. Since the capacitance of a printed capacitor is a function of the distance between the printed electrodes, this distance, in a mass production of similar circuits, has to be the same for each capacitor to have substantially the same capacitance. Mass produced capacitors by the aforementioned methods, however, are not always of the same capacitance because the distance between the adjacent electrodes sometimes tends to vary from circuit to circuit. It is, therefore, necessary to measure the capacitance of each capacitor and to trim one or both of its electrodes, as by sand blasting, for example, to obtain the desired value of capacitance. This latter procedure is difficult because of the small areas of the electrodes, and is wasteful of both time and effort.

It has also been proposed to print a circular coplanar capacitor, comprising a circular disc electrode surrounded by an annular electrode, but such a structure provides a relatively low value of capacitance for its overall size. In addition to being wasteful of space, the circular capacitor does not lend itself easily to screen printing wherein the printing screen comprises wires disposed at right angles to each other. Also, the circular capacitor is relatively difficult to trim to a desired capacitance.

SUMMARY OF THE INVENTION

The improved capacitor, on one embodiment thereof, comprises a pair of coplanar, spaced-apart, inner and outer electrodes on the surface of a substrate of electrically insulating material. The inner electrode comprises at least one linear, electrical conductor, and the outer electrode comprises linear, electrical conductor means that substantially surround the inner electrode.

In another embodiment of the improved capacitor, the pattern of the outer conductor includes linear, electrical conductors that are interdigitated with the conductors of the inner electrode.

In a further embodiment of the improved capacitor, the space between the inner and outer electrodes is filled with a dielectric material to increase the capacitance of the capacitor.

The improved capacitor has the advantage of having a substantially constant capacitance for given sizes of the inner and outer electrodes, regardless of the relative position of the inner electrode with respect to the outer electrode. Also, the improved capacitor is relatively easy to print with stencil or screen methods because the components of the capacitor are substantially parallel to the components of a screen, and the capacitor is economical of space in that it provides a relatively high, easily adjustable capacitance for the relatively small area it occupies on a substrate.

DESCRIPTION OF THE PREFERRED EMBODIMENTS

Figure 1:
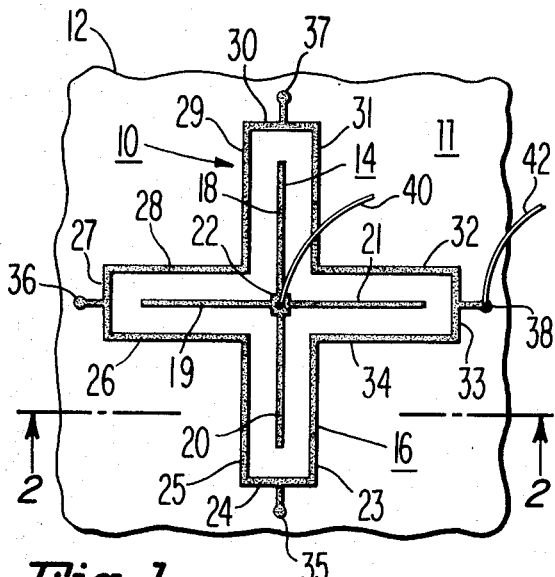
FIG. 1 is a plan view of one embodiment of the improved capacitor, showing an inner electrode centered with respect to an outer electrode, and also showing wires connected to terminals of the electrodes.
Figure 2:
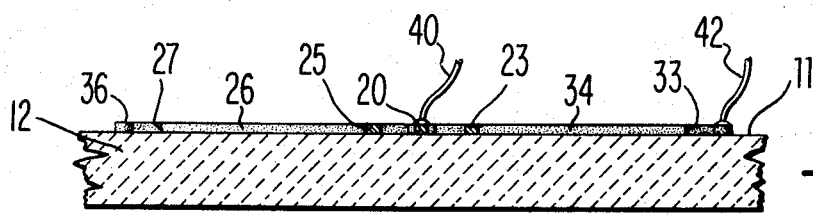
FIG. 2 is a cross-sectional view of the capacitor shown in FIG. 1, taken along the line 2—2 and viewed in the direction indicated by the arrows.

Referring now to FIGS. 1 and 2 of the drawing, there is shown an improved capacitor 10 printed on a surface 11 of a substrate 12 of electrically insulating material, such as a ceramic, glass, or plastic material. The capacitor 10 comprises an inner electrode 14 disposed within, and surrounded by, a coplanar, outer electrode 16. The inner electrode 14 is in the general shape or pattern of a cross and comprises linear electrical conductors 18, 19, 20, and 21 extending from a common electrical connection, or terminal land 22. The conductors 18 and 20 are substantially perpendicular to the conductors 19 and 21.

The electrode 14 is formed on the surface 11 of the substrate 12 by stencil or screen printing techniques well known in the art. For example, a metallizer ink is applied to the surface 11 of the substrate 12 in the pattern of the electrode 14 through a prepared stenciled printing screen. The applied metallized ink is dried at a temperature of about 110° C. for about 10 to 20 minutes and then fired at a temperature of about 600° C. for about 5 minutes. Suitable metallizer inks are, for example, ESL 590 silver ink manufactured by Electro Science Labs., Philadelphia, Pa., or DP–4887 silver ink manufactured by E. I. du Pont de Nemours Company, Niagara Falls, N. Y.

The outer electrode 16 is also printed in the general shape or pattern of a cross on the surface 11 and comprises a plurality of electrically connected, linear electrical conductors 23, 24, 25, 26, 27, 28, 29, 30, 31, 32, 33, and 34. The conductors 23–34 of the outer electrode 16 are substantially parallel to the conductors 18–21 of the inner electrode 14. Electrically conductive pads or terminal lands 35, 36, 37, and 38 are electrically connected to the conductors 24, 27, 30, and 33, respectively, of the outer conductor 16 by printed conductors for making circuit connections thereto. The outer electrical conductor 16 is also applied to the surface 11 of the substrate 12 by metallizer ink, as described for the inner electrode 16.

In printing the capacitor 10 by stencil or screen printing methods, during the manufacture of a hybrid integrated circuit, it may sometimes be necessary to print the inner and outer electrodes 14 and 16 of the capacitor 10 in successive, printing operations, rather than simultaneously. This procedure can cause relative misregistrations of the electrodes that comprise the printed capacitor. Errors, such as produced by photographic aberrations, during the making of the printing screen, and/or variations in the applied pressure of the printing inks may also cause the inner electrode 14 of the capacitor 10 to be displaced from its central position within the outer electrode 16.

Figure 3:
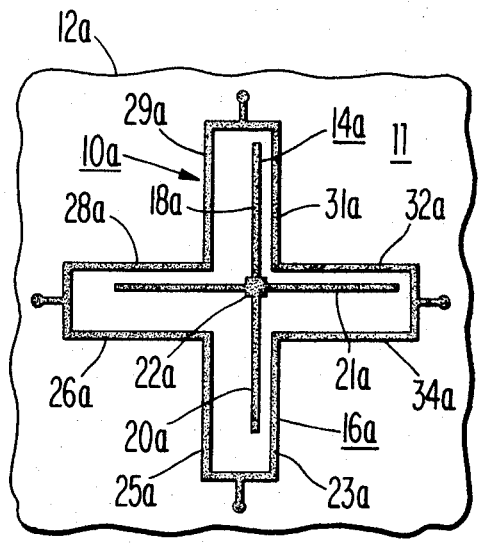
FIG. 3 is a plan view of the improved capacitor, similar to that of FIG. 1, but with the inner electrode displaced, that is, not centered with respect to the outer electrode.

Referring now to FIG. 3 of the drawing, there is shown an improved capacitor 10a having an inner electrode 14a displaced from its centered position within an outer electrode 16a. The parts of the capacitor 10a that are substantially similar to the parts of the capacitor 10 are given the same reference numerals as those in the capacitor 10, but the reference character "a" is added to each reference numeral. The inner and outer electrodes 14a and 16a are the same in size as the inner and outer electrodes 14 and 16 of the capacitor 10, but in the capacitor 10a the inner electrode 14a is displaced (translated) upwardly and to the right (looking at FIG. 3) with respect to the outer electrode 16a; that is, the electrode 14a is not centered with respect to the outer electrode 16a, as is the inner electrode 14 with respect to the outer electrode 16 of the capacitor 10. As long as the physical dimensions of the electrodes 14a and 16 a of the capacitor 10a are the same as the electrodes 14 and 16 of the capacitor 10, however, the capacitor 10a will exhibit substantially the same capacitance as that of the capacitor 10.

Referring to FIG. 3, it is seen that the displacement (from a centered position) of the inner electrode 14a with respect to the outer electrode 16a of the capacitor 10a has increased the capacitance between the electrodes 18a and 31a, 21a and 32a, 20a and 23a, and 19a and 28a; but this displacement has also decreased the capacitance between the electrodes 18a and 29a, 21a and 34a, 20a and 25a, and 19a and 26a. Thus, any displacement of the inner electrode 14a with respect to the outer electrode 16a provides an increased capacitance that is counteracted by a substantially equal decreased capacitance so that the resultant capacitance remains substantially constant. Hence, the improved capacitors may be said to be self-compensating. A rotational displacement of the inner electrode 14a with respect to the outer electrode 16a, will, for the same reasons, not substantially change the capacitance of the capacitor 10a.

The capacitor 10 can be connected in an electrical circuit by electrical conductors connected to its terminal lands. Thus, a wire 40, as shown in FIG. 1, is soldered, or bonded, to the terminal land 22 and a wire 42 is soldered, or bonded, to the terminal land 38 of the outer electrode 16. The other terminal lands 35–37 can be used instead of the terminal land 38 if it is more convenient to do so in a particular electronic circuit.

Figure 4:
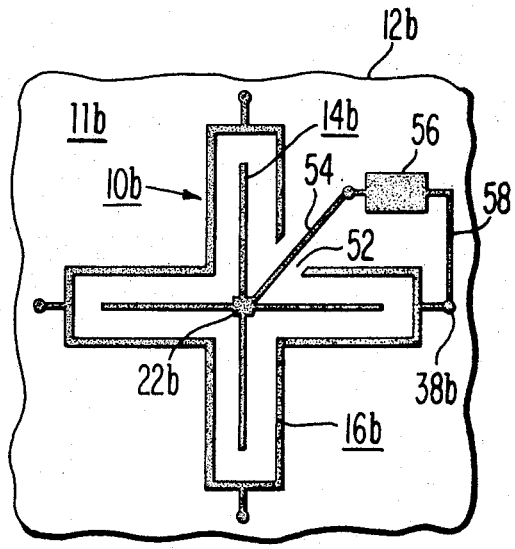
FIG. 4 is a plan view of another embodiment of the improved capacitor showing the capacitor connected to a circuit element by printed conductors.

Referring now to FIG. 4 of the drawing, there is shown an improved capacitor 10b that is substantially similar to the capacitors 10 and 10a. The parts of the capacitor 10b that are substantially similar to the parts of the capacitor 10 are given the same reference numerals as those for the capacitor 10, but a reference character "b" is added to the reference numeral. In the capacitor 10b, however, an outer electrode 16b substantially surrounds an inner electrode 14b and has a relatively small discontinuity, break, or opening 52 therein so that a printed conductor 54 can connect a terminal land 22b of the inner electrode 14b to one terminal of a printed electronic component 56, such as a printed resistor on the surface 11b for example. A printed conductor 58 is shown connecting a terminal land 38b of the outer electrode 16b with another terminal of the component 56.

The capacitor 10b functions the same as the capacitor 10. Since the outer electrode 16b substantially surrounds the inner electrode 14b, the inner electrode 14b can be displaced from its centered position within the area bounded by the outer electrode 16b and the capacitor 10b will still exhibit a constant value of capacitance.

Figure 5:
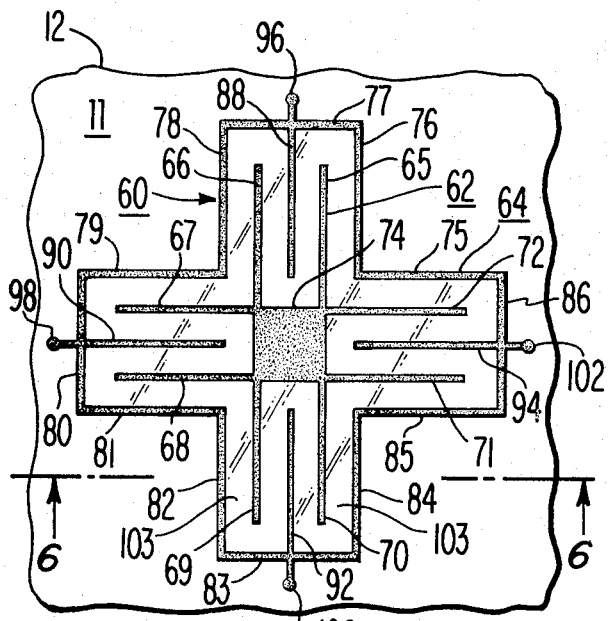
FIG. 5 is a plan view of still another embodiment of the improved capacitor.

Referring now to FIG. 5 of the drawing there is shown a novel capacitor 60, an embodiment of the improved capacitor useful for providing a relatively high capacitance for a printed capacitor of relatively small size. The capacitor 60 comprises an inner electrode 62 and an outer electrode 64. The inner electrode 62 comprises a plurality of linear electrical conductors 65, 66, 67, 68, 69, 70, 71, and 72 extending from, and electrically connected to, a common electrical connection, or terminal land 74. The outer electrode 64 is coplanar with, and closely spaced from, the inner electrode 62 and comprises a plurality of electrically connected linear conductors 75, 76, 77, 78, 79, 80, 81, 82, 83, 84, 85, and 86. The conductors 65 and 66, are parallel to, and spaced from, each other and are substantially perpendicular to the space conductors 67, 68, 71, and 72. The conductors 69 and 70 are also parallel to, and spaced from, each other and are substantially perpendicular to the conductors 67, 68, 71, and 72.

To increase the capacitance of the capacitor 60, the length of the outer conductor 64 is increased. To this end, a linear conductor 88 is electrically connected to the conductor 77 of the outer electrode 64 and interdigitated between the conductors 66 and 65 of the inner electrode 62. Similarly, a conductor 90 is connected to the conductor 80 and interdigitated between conductors 67 and 68; a conductor 92 is connected to the conductor 83 and interdigitated between the conductors 69 and 70; and a conductor 94 is connected to the conductor 86 and interdigitated between the conductors 71 and 72.

Electrical connection means to the outer electrode 64 are provided by terminal lands 96, 98, 100 and 102 electrically connected to the conductors 77, 80, 83, and 86, respectively. The outer electrode 64 may also have a small discontinuity or opening (not shown) therein, like the opening 52 in the outer electrode 16b of the capacitor 10b, for making printed conductor connections to the terminal land 74 of the inner electrode 62, without substantially affecting the function of the capacitor 60.

The improved capacitor 60, like the novel capacitors 10, 10a, and 10b, has its inner and outer electrodes 62 and 64 in the general shape or pattern of a cross so that one electrode may be rotationally or translationally displaced with respect to the other and still, because of its symmetrical construction, provide a constant capacitance as long as the inner and outer electrodes do not touch each other.

Figure 6:
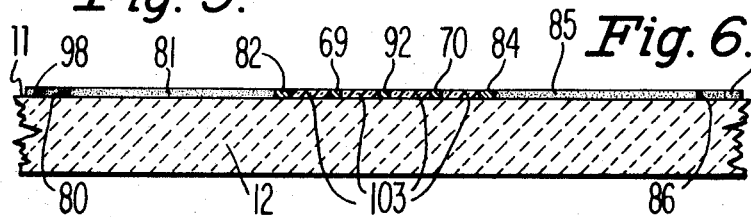
FIG. 6 is a cross-sectional view of the capacitor shown in FIG. 5, taken along the lines 6—6 and viewed in the direction indicated by the arrows.

The capacitance of the capacitor 60 can be increased by adding a dielectric filler material 103, whose dielectric constant is greater than that for air, between the inner electrode 62 and outer electrode 64, as shown in FIG. 6. The amount of increased capacitance so produced will be a function of the dielectric constant.

In the manufacture of printed circuits by stencil or screening methods, the displacement of one electrode with respect to the other is usually in either a horizontal or vertical direction because printing screens are usually made of wires that extend in directions perpendicular to each other. A rotational displacement of one electrode with respect to the other, in the improved capacitors described herein, however, would also provide a substantially constant capacitance because, in symmetrical structure of the types described, any increased capacitance produced by the displacement is simultaneously compensated by a decrease in capacitance.

Thus, there has been described several embodiments of an improved capacitor wherein a misregistration of its coplanar plates, that is, a displacement in any direction of an inner electrode with respect to an outer electrode does not substantially change its capacitance.

The accuracy of capacitance obtainable by the structures of the improved capacitors described herein eliminate, or substantially reduce, the need for subsequent compensatory operations and/or adjustments, such as would otherwise be necessary with prior-art capacitors to achieve the same level of accuracy. Also, if any adjustment of the novel printed capacitors is necessary, it can be done easily and accurately by trimming one or more of the relatively thin linear conductors of the electrodes. The improved capacitors are also economical of space in that they provide a relatively high capacitance for the area they occupy on a substrate. For example, a capacitor of the type described for the capacitor 10 in FIG. 1 that comprises fired metallized silver, wherein each of the conductors of the coplanar electrodes has a thickness of 0.5 millimeters, is spaced from an adjacent conductor by a distance of 0.5 millimeters, and has a length of 6 millimeters, provides a capacitance of 2.23 pf. A capacitor of the type described for the capacitor 60 in FIG. 5, (without a dielectric filler material 103) wherein the interdigitated conductors have a length of 6 millimeters, a thickness of 0.5 millimeters, and are spaced from each other a distance of 0.5 millimeters, provides a capacitance of 3.567 pf. The latter capacitance is higher when a dielectric filler material is disposed between the electrodes.

I claim:

1. A capacitor comprising:
  a substrate of electrically insulating material,
  a pair of coplanar, spaced-apart, inner and outer electrodes on a surface of said substrate, said inner electrode comprising a pattern of a plurality of electrical linear conductors that extend from a common electrical connection, said outer electrode comprising a pattern of a plurality of electrically connected linear conductors substantially parallel to, and substantially surrounding said linear conductors of said inner electrode, and said patterns being in the general shape of a cross.

2. A capacitor as in claim 1 wherein:

said outer electrode surrounding said inner electrode is formed with a discontinuity therein, whereby a printed circuit conductor can be disposed through said discontinuity to said inner conductor for connection thereto.

3. A capacitor as in claim 1 wherein:

a dielectric filler material is deposited between said inner and outer electrodes.

4. A capacitor comprising:

a substrate of dielectric material, an outer electrode comprising a pattern of connected linear conductors on a surface of said substrate substantially surrounding an area on said surface, an inner electrode, comprising a pattern of linear conductors extending in the general shape of a cross from a terminal land, being disposed on said surface within said area, and being coplanar with, and spaced from, said first electrode, and said conductors of said pattern of said outer electrode being interdigitated with, and substantially parallel to, said conductors of said pattern of said inner electrode.

5. A capacitor as in claim 4 wherein:

a dielectric filler material is disposed between said inner and outer electrodes.

6. A capacitor as in claim 4 wherein:

said outer electrode is formed with a relatively small discontinuity, whereby a printed connection may be made through said discontinuity to said terminal land of said inner electrode.

* * * * *